(12) United States Patent
Engler et al.

(10) Patent No.: US 9,371,449 B2
(45) Date of Patent: Jun. 21, 2016

(54) BORON NITRIDE AGGLOMERATES, METHOD FOR THE PRODUCTION THEREOF AND USE THEREOF

(71) Applicant: ESK Ceramics GmbH & Co. KG, Kempten (DE)

(72) Inventors: Martin Engler, Kempten (DE); Krishna B. Uibel, Waltenhofen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/399,664

(22) PCT Filed: Mar. 19, 2013

(86) PCT No.: PCT/EP2013/055724
§ 371 (c)(1),
(2) Date: Nov. 7, 2014

(87) PCT Pub. No.: WO2013/167306
PCT Pub. Date: Nov. 14, 2013

(65) Prior Publication Data
US 2015/0137026 A1 May 21, 2015

(30) Foreign Application Priority Data
May 9, 2012 (DE) .......................... 10 2012 104 049

(51) Int. Cl.
*B32B 5/16* (2006.01)
*B32B 9/00* (2006.01)
(Continued)

(52) U.S. Cl.
CPC ................. *C09C 1/00* (2013.01); *C01B 21/064* (2013.01); *C01B 21/0648* (2013.01);
(Continued)

(58) Field of Classification Search
CPC ....................................................... C04B 35/583
USPC .................................. 501/96.4; 428/325, 402
See application file for complete search history.

(56) References Cited

U.S. PATENT DOCUMENTS 5,854,155 A 12/1998 Kawasaki
6,048,511 A 4/2000 Shaffer
(Continued)

FOREIGN PATENT DOCUMENTS

DE 31 06 675 A1 12/1981
EP 0 939 066 A1 9/1999
(Continued)

OTHER PUBLICATIONS

F. Hill, SMTA National Symposium "Emerging Packaging Technologies," Research Triangle Park, N.C., Nov. 18-21, 1996).

*Primary Examiner* — Noah Wiese
(74) *Attorney, Agent, or Firm* — C. Michael Geise

(57) ABSTRACT

The invention relates to boron nitride agglomerates, comprising hexagonal boron nitride primary particles, wherein the hexagonal boron nitride primary particles are connected to one another by means of an inorganic binding phase comprising at least one nitride and/or oxynitride. The invention also relates to a method for producing such boron nitride agglomerates, wherein boron nitride starting powder in the form of boron nitride primary particles is mixed with binding-phase raw materials, processed into granules or molded bodies and these are then subjected to a temperature treatment at a temperature of at least 1000° C. in a nitriding atmosphere, and the obtained granules or molded bodies are comminuted and/or fractionated if necessary. The boron nitride agglomerates according to the invention are suitable as a filler for polymers to be used for producing polymer-boron nitride composite materials.

19 Claims, 5 Drawing Sheets

(51) Int. Cl.
    *C09C 1/00*     (2006.01)
    *C01B 21/064*     (2006.01)
    *C04B 35/583*     (2006.01)
    *C08K 3/38*     (2006.01)
    *C04B 35/581*     (2006.01)
    *C04B 35/626*     (2006.01)
    *C04B 35/63*     (2006.01)
    *C04B 35/65*     (2006.01)

(52) U.S. Cl.
CPC ............ *C04B 35/581* (2013.01); *C04B 35/583* (2013.01); *C04B 35/62675* (2013.01); *C04B 35/6303* (2013.01); *C04B 35/65* (2013.01); *C08K 3/38* (2013.01); *C01P 2004/03* (2013.01); *C01P 2004/45* (2013.01); *C01P 2004/61* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3232* (2013.01); *C04B 2235/3409* (2013.01); *C04B 2235/3418* (2013.01); *C04B 2235/386* (2013.01); *C04B 2235/3813* (2013.01); *C04B 2235/3865* (2013.01); *C04B 2235/3869* (2013.01); *C04B 2235/3873* (2013.01); *C04B 2235/3886* (2013.01); *C04B 2235/402* (2013.01); *C04B 2235/404* (2013.01); *C04B 2235/428* (2013.01); *C04B 2235/46* (2013.01); *C04B 2235/465* (2013.01); *C04B 2235/5427* (2013.01); *C04B 2235/5436* (2013.01); *C04B 2235/5445* (2013.01); *C04B 2235/80* (2013.01); *C08K 2003/385* (2013.01); *Y10T 428/2982* (2015.01)

(56) References Cited

U.S. PATENT DOCUMENTS

| | | | |
|---|---|---|---|
| 6,096,671 | A | 8/2000 | Kawasaki |
| 6,645,612 | B2 * | 11/2003 | Pujari .................. C01B 21/064 257/717 |
| 7,494,635 | B2 * | 2/2009 | Pruss .................. C01B 21/064 219/764 |
| 2002/0006373 | A1 | 1/2002 | Clere |
| 2004/0208812 | A1 | 10/2004 | Clere |
| 2006/0127422 | A1 | 6/2006 | Lodyga |
| 2008/0076856 | A1 | 3/2008 | Zhong |
| 2009/0120011 | A1 | 5/2009 | Okamura |
| 2009/0169840 | A1 | 7/2009 | Okamura |
| 2010/0226095 | A1 | 9/2010 | Mimura |
| 2012/0046387 | A1 | 2/2012 | Chu |
| 2012/0114905 | A1 * | 5/2012 | Engler ................ C01B 21/0648 428/143 |

FOREIGN PATENT DOCUMENTS

| | | |
|---|---|---|
| GB | 742 324 A | 12/1955 |
| WO | WO 03/013845 A1 | 2/2003 |
| WO | WO 2005/021428 A1 | 3/2005 |
| WO | WO 2006/023860 | 3/2006 |

* cited by examiner

Figure 6a
Figure 6b
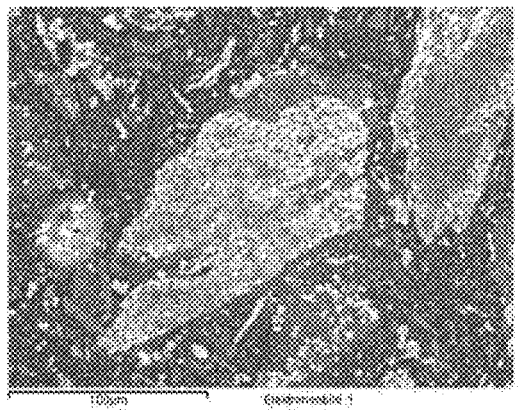
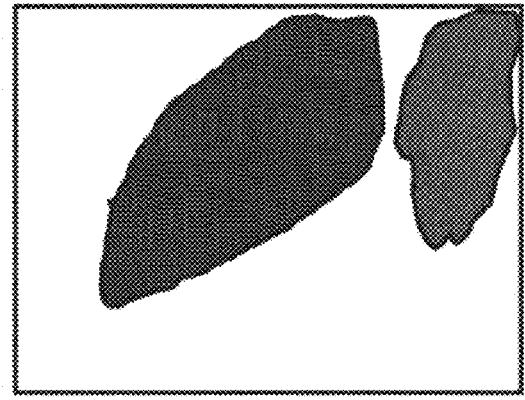
Illustration 1: Left: SEM image of an agglomerate
Figure 6c
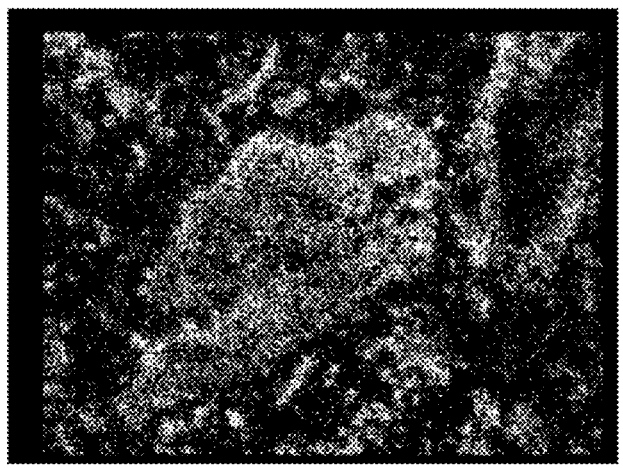
Al Ka1

BORON NITRIDE AGGLOMERATES, METHOD FOR THE PRODUCTION THEREOF AND USE THEREOF

CROSS REFERENCE TO RELATED APPLICATIONS

This application is a national stage filing under 35 U.S.C. 371 of PCT/EP2013/055724, filed Mar. 19, 2013, which claims priority to German Patent Application No. 102012104049.4, filed May 9, 2012, the disclosures of which are incorporated by reference in their entirety herein.

FIELD OF THE INVENTION

The present invention relates to boron nitride agglomerates or boron nitride-based agglomerates, comprising hexagonal boron nitride; a method for the production thereof and the use of such agglomerates as filler for polymers for the production of polymer-boron nitride composite materials.

BACKGROUND OF THE INVENTION

Due to its good thermal conductivity, hexagonal boron nitride powder may be used as a filler for polymers in applications which simultaneously require good electrical insulation capability of the filler that is used. Furthermore, boron nitride powder is also used as a sintering powder for hot pressing in applications in metallurgy. Hexagonal boron nitride powder is moreover used in cosmetic preparations, as a lubricant, as a release agent in metallurgy and as a raw material for producing cubic boron nitride.

Hexagonal boron nitride powder is technically synthesized by nitridation of boric acid in the presence of a nitrogen source. Ammonia may be used as the nitrogen source, in which case calcium phosphate is typically used as a carrier material for the boric acid. An organic nitrogen source, such as melamine or urea, may also be reacted under nitrogen with boric acid or borates. Nitridation is typically carried out at temperatures of 800 to 1200° C. The boron nitride thus obtained is largely amorphous and is also referred to as turbostratic boron nitride. From the amorphous boron nitride, hexagonal, crystalline boron nitride is produced at higher temperatures of up to about 2100° C., preferably in a nitrogen atmosphere. For this high-temperature treatment, crystallization additives are also frequently added to the amorphous boron nitride.

Hexagonal boron nitride (hBN) in the form of primary particles having a platelet morphology develops during the high-temperature treatment. Typical platelet sizes range from approximately 1 to 20 µm; but platelet sizes of up to 50 µm and more are possible. After production, the annealed mass is usually milled or de-agglomerated in order to obtain powders capable of being processed.

The thermal conductivity of hexagonal boron nitride is greater in the plane of the platelet (a-axis) than perpendicular thereto (c-axis). In the direction of the c-axis, the thermal conductivity is 2.0 W/mK; by contrast, in the direction of the a-axis, it is 400 W/mK (see R. F. Hill, SMTA National Symposium "Emerging Packaging Technologies," Research Triangle Park, N.C., Nov. 18-21, 1996).

In addition to platelet-shaped primary boron nitride particles or agglomerates of such primary particles which accumulate during the synthesis of hexagonal boron nitride, hexagonal boron nitride powder is also frequently used for filler purposes in the form of specifically produced granules, i.e. in the form of secondary particles built up from the primary particles. Granulation improves the processing properties, such as flowability and dosing of the boron nitride powder, and it is possible to achieve higher filler loadings and higher thermal conductivities, for example in polymer-boron nitride composite materials. In doing so, there are different methods for producing such secondary particles that lead to granules having different morphologies and different properties.

For the specifically produced granules, the term "agglomerates" is often used; the term is likewise used for the agglomerates or aggregates accumulating due to manufacturing conditions during the synthesis of hexagonal boron nitride.

PRIOR ART

Known methods for producing granules are build-up granulation and spray granulation. Spray granulation starts with a suspension of a solid in a liquid, which is atomized to form droplets and these are subsequently dried. In build-up granulation, a small amount of liquid is added to the solid, which liquid agglomerates the solid primary particles due to surface wetting and capillary forces; these agglomerates are subsequently dried. Both methods yield secondary particles of low density or, respectively, high porosity.

US 2006/0 127 422 A1 describes a method for producing spherical boron nitride agglomerates, in which platelet-shaped, hexagonal boron nitride is spray-dried from an aqueous suspension with an organic binder. Spray-drying results in spherical boron nitride granules having an average agglomerate size of 1 to 500 µm. Unlike the starting powder, the spray granules are capable of flowing.

WO 03/013 845 A1 describes a method for producing spherical boron nitride granules, in which primary particles of hexagonal boron nitride are spray-dried with the addition of polycarboxylic acids, silanes or organometallic compounds, and in which the obtained spray-granules are then sintered at temperatures of between 1800 and 2400° C.

One possibility for producing boron nitride granules for filler applications is described in U.S. Pat. No. 6,048,511 and EP 0 939 066 A1. There, hexagonal boron nitride powder is processed into particles, the size distribution of which extends beyond a minimal size range of 100 µm; the milled hBN powder is cold-pressed; granules are subsequently produced by breaking up the cold-pressed shaped article; and, finally, the granules thus formed are sieved in order to obtain agglomerates of a desired size range. Through several repetitions of the steps of breaking and cold-pressing, shaped articles having a density of up to 1.91 g/cm$^3$ may be pressed from which granules may be produced via breaking. This method has the disadvantage of being very expensive because a specific size distribution of the starting powder must first be set, and compaction and comminution must then be carried out in several steps.

In US 2002/0 006 373 A1, briquettes of the agglomerated boron nitride platelets, which form when the hexagonal boron nitride is produced during the high-temperature treatment under nitrogen at 1400 to 2300° C., are milled, whereby a powder forms that contains agglomerates of hexagonal boron nitride and non-agglomerated boron nitride platelets, and the non-agglomerate platelets are subsequently removed, resulting in a powder that forms from agglomerates of hexagonal boron nitride platelets having an agglomerate size distribution of 10 to 125 µm.

US 2004/0 208 812 A1 describes a method for producing a boron nitride agglomerate containing boron nitride powder, in which hexagonal boron nitride having an average platelet size of the least 2 µm is pressed to form green bodies; the green bodies are then sintered at temperatures exceeding 1400° C. to densities of 1.4-1.7 g/cm³, and the obtained sintered bodies are subsequently milled.

WO 2005/021 428 A1 describes a method for producing boron nitride agglomerates of low and medium density, in which turbostratic or hexagonal boron nitride powder having a particle size of no more than 5 μm is subjected to a temperature treatment in excess of 1400° C., preferably 1850 to 1900° C., and is subsequently milled. Prior to the temperature treatment, the boron nitride powder may be pressed and milled isostatically to form shaped bodies. The created agglomerates are spherical to cube-shaped, and the agglomerates have isotropic properties.

U.S. Pat. No. 5,854,155 and U.S. Pat. No. 6,096,671 describe a method for producing aggregated platelet-shaped boron nitride particles, in which the boron nitride platelets in the aggregate are connected to one another without a binder. The boron nitride aggregates are pine cone-shaped; they already form during the synthesis of the hexagonal boron nitride from boric acid, melamine and crystallization catalysts.

The methods for producing boron nitride granules described thus far have in common that the achievable mechanical stability is often insufficient. Therefore, when used as a filler for polymers (such as thermoplasts, duroplasts and silicones, for example) partial or even complete disintegration of the agglomerates may occur as a result of the high shear forces occurring during processing; that is, the agglomerate may disintegrate into the boron nitride primary particles from which they are built, i.e. into the individual boron nitride platelets. This interrupts the heat conduction pathways that are provided by an intact agglomerate. New and numerous heat transfers develop between the finely dispersed boron nitride filler particles and the polymer. An increased number of heat transfers lowers the thermal conductivity in the compound. Moreover, the surface area of the filler increases when the agglomerate disintegrates, resulting in the rheological properties of the compound worsening to such a degree that the obtainable filler content in the compound is lowered, which further worsens the achievable thermal conductivity.

OBJECT OF THE INVENTION

The invention therefore addresses the object of providing boron nitride agglomerates having good mechanical stability, in particular for use as filler for polymers, while overcoming the disadvantages of the prior art.

The invention furthermore addresses the object of providing a cost-effective, simple method for producing boron nitride agglomerates having good mechanical stability.

SUMMARY OF THE INVENTION

The above object is achieved according to the invention via boron nitride agglomerates according to claim 1, a method for producing such boron nitride agglomerates according to claim 10 and a polymer-boron nitride composite material according to claim 20.

The subject matter of the invention thus relates to boron nitride agglomerates comprising hexagonal boron nitride primary particles, wherein the hexagonal boron nitride primary particles are connected to one another by means of an inorganic binding phase which comprises at least one nitride and/or oxynitride.

A subject matter of the invention is likewise a method for producing such boron nitride agglomerates, wherein boron nitride starting powders in the form of boron nitride primary particles are mixed with binding phase raw materials, are processed into granules or shaped articles, and which granules or shaped articles are subsequently subjected to a temperature treatment at a temperature of at least 1000° C. in a nitriding atmosphere, and wherein the obtained granules or shaped articles are comminuted and/or fractionated, if necessary.

The boron nitride agglomerates according to the invention may also be referred to as nitride-bonded boron nitride agglomerates or boron nitride agglomerates with nitridic binding phase.

A subject matter of the invention is furthermore a polymer-boron nitride composite material comprising boron nitride agglomerates according to the invention.

In their structure, the agglomerates according to the invention are built up from many individual boron nitride platelets that are connected to one another via a binding phase. The binding phase comprises at least one nitride and/or oxynitride.

In the agglomerates according to the invention, the boron nitride platelets are substantially oriented toward each other without a preference in any particular direction, resulting in the agglomerates according to the invention having largely isotropic properties.

In contrast to the non-agglomerated boron nitride powders, the agglomerates according to the invention are pourable and easy to dose. With the same proportion of boron nitride, higher thermal conductivity values may be achieved in polymer-boron nitride composite materials with the agglomerates according to the invention than with non-agglomerated boron nitride powders. With the agglomerates according to the invention, higher filler loadings may be achieved in polymer-boron nitride composite materials than with non-agglomerated powders.

Surprisingly, it has been found that it is possible to produce agglomerates having good mechanical stability using the method according to the invention. Mechanical stability of the agglomerates is important because the agglomerates must withstand (if possible without disintegrating) filling, transporting, dosing, compounding and shaping, for example by means of injection molding, casting or compressing, hence, further processing of the boron nitride agglomerates into polymer-boron nitride mixtures and polymer-boron nitride composite materials. Should the agglomerates disintegrate during compounding, the danger exists that the rheological properties of the polymer-boron nitride mixtures worsen and the thermal conductivity in the polymer-boron nitride composite materials decreases.

It is furthermore surprising that higher thermal conductivity values may be achieved with the boron nitride agglomerates according to the invention having a nitridic binding phase in the filled polymers than with binder-free boron nitride agglomerates.

With isotropic agglomerates, thermal conductivity in filled polymers is not as directionally dependent as with the use of platelet-shaped fillers (hence, for example, platelet-shaped boron nitride primary particles). However, minimizing the directional dependence may only be successfully accomplished if the isotropic agglomerates are mechanically stable enough to survive the compounding step in particular. For pure boron nitride agglomerates, this is not the case. With the nitride-bonded boron nitride agglomerates having good mechanical stability, the directional dependence of the thermal conductivity in polymer-boron nitride composite materials (filled polymers) may be markedly decreased.

SHORT DESCRIPTION OF THE INCLUDED DRAWINGS

Figure 1:
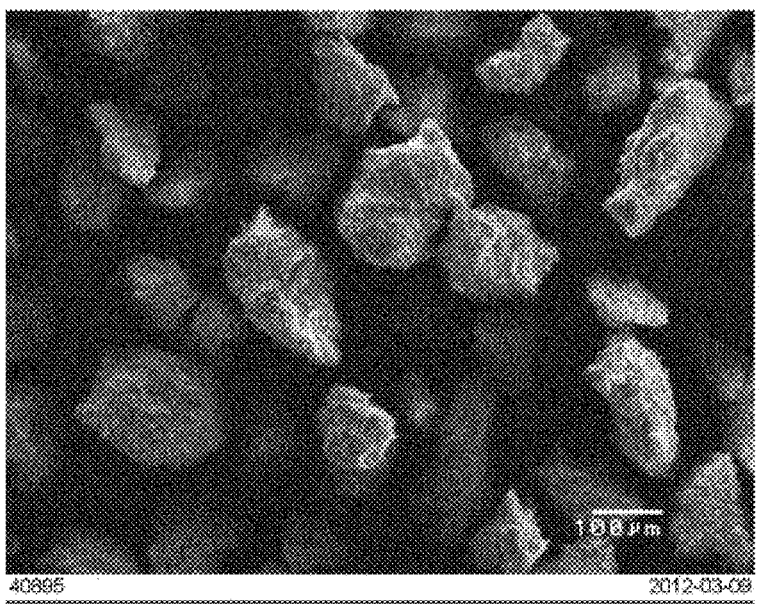
FIG. 1 shows a SEM image of agglomerates according to the invention according to example 9, magnified 100 times.
Figure 2:
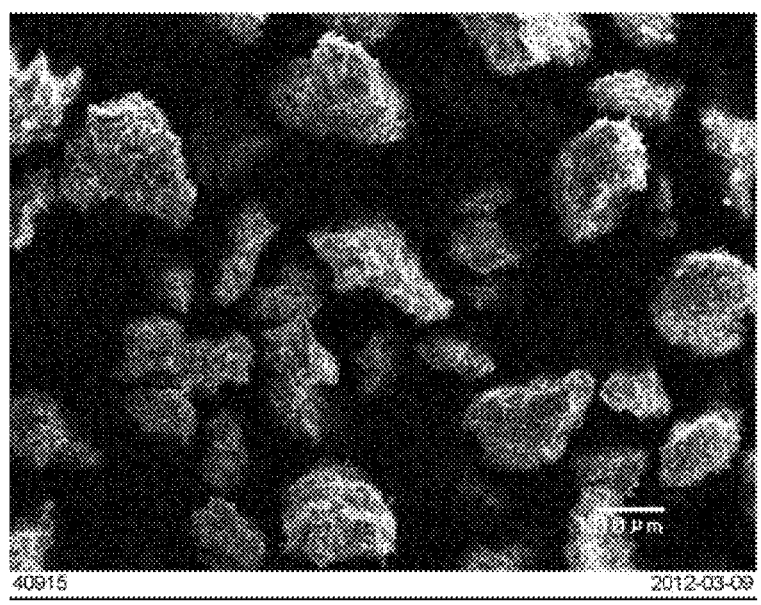
FIG. 2 shows a SEM image of agglomerates according to the invention according to example 16, magnified 100 times.
Figure 3:
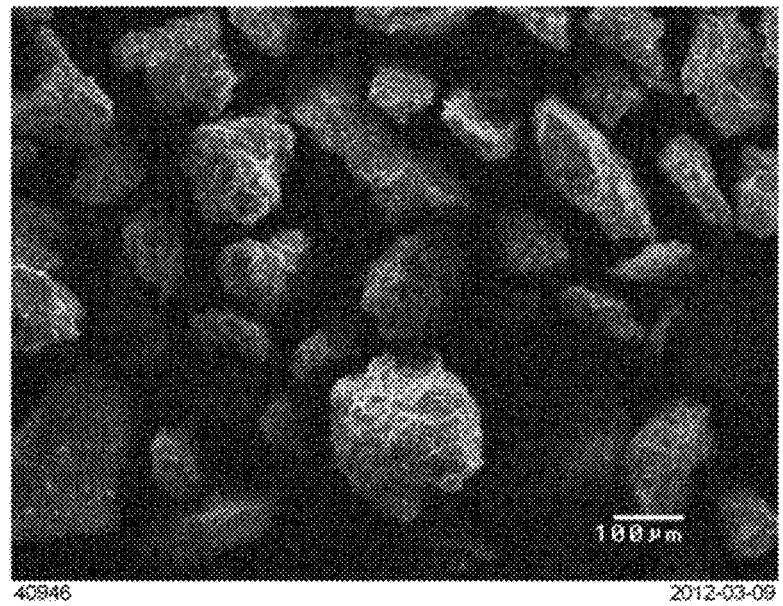
FIG. 3 shows a SEM image of agglomerates according to the invention according to example 23, magnified 100 times.
Figure 4A:
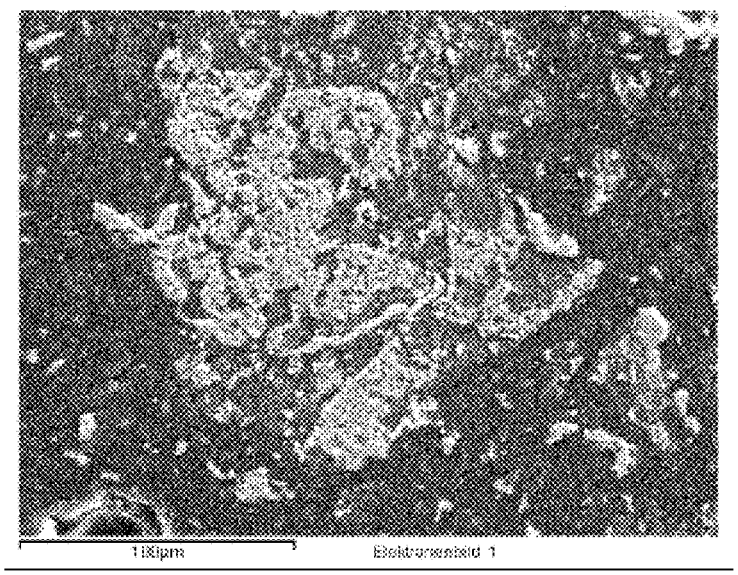
Figure 4B:
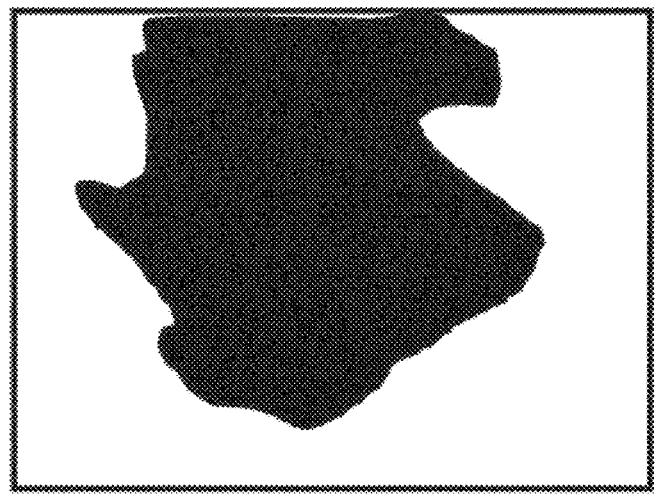
Figure 4C:
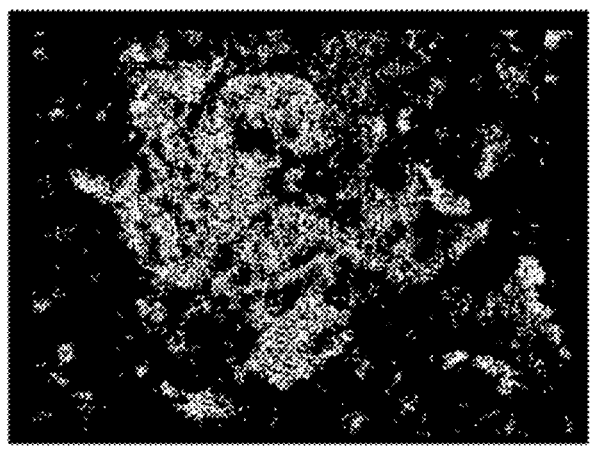
Figure 5A:
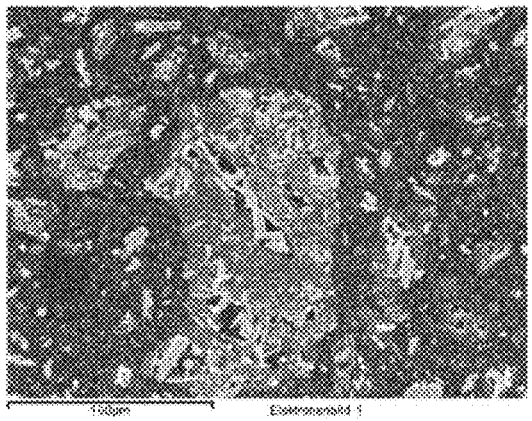
Figure 5B:
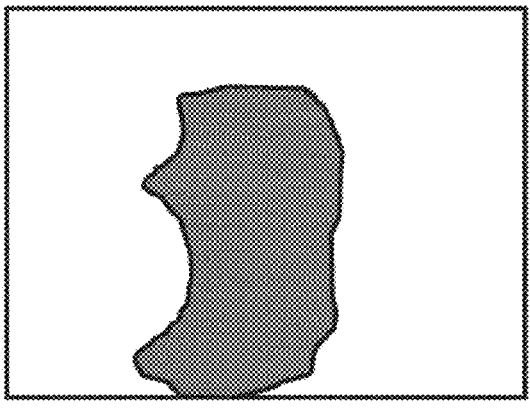
Figure 5C:
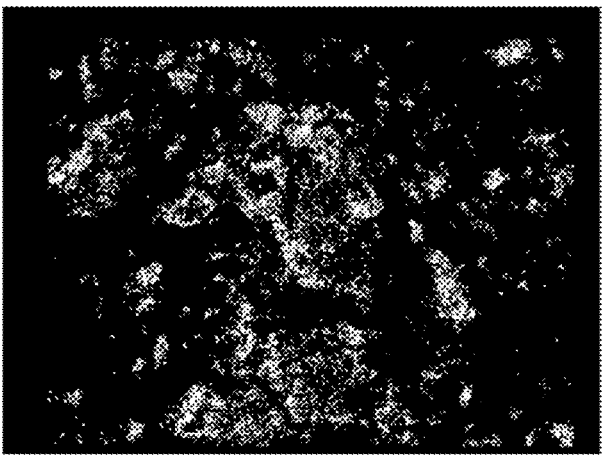

FIGS. 4 *a-c*, 5 *a-c* and 6 *a-c* show experiments on polished cross-sections of agglomerates according to the invention (FIGS. 4 *a-c*: example 9, FIGS. 5 *a-c*: example 16, FIGS. 6 *a-c*: example 23). FIGS. 4*a*, 5*a* and 6*a* show SEM images of polished cross-sections of agglomerates according to the invention that were embedded in epoxide. In the images, the epoxide is dark gray. The boron nitride is light gray, the binding phase (aluminum nitride) is even lighter. For better orientation, FIGS. 4*b*, 5*b* and 6*b* show the contour of the examined agglomerate. FIGS. 4*c*, 5*c* and 6*c* show the associated EDX surface area scans for the element aluminum. The lightness of the pixels on the surface area scan indicates the number of counts for the Al-Kα line. The lighter they are, the more counts, the more aluminum. There are no counts in the black areas, hence also no aluminum. Based on these images, it is easy to see that the light areas in the agglomerates of FIGS. 4*a*, 5*a* and 6*a* correspond to the aluminum-rich areas of FIGS. 4*c*, 5*c* and 6*c*.

In FIG. 4*c*, the aluminum is distributed inhomogeneously in the agglomerate. Individual crystallites of a secondary phase are not visible. There are aluminum-rich and aluminum-poor areas in the agglomerate.

In FIG. 5*a*, the binding phase may be recognized as needle- or platelet-shaped inclusions in the agglomerate.

In FIG. 5*c*, the aluminum is distributed inhomogeneously in the agglomerate. Aluminum-poor and aluminum-free regions may be recognized in addition to the aluminum-rich areas of the secondary phase.

In FIG. 6*c*, the aluminum is distributed homogeneously across wide areas. The core of the right agglomerate contains an aluminum-free area. More aluminum tends to be detected in surface-proximal areas of the agglomerates than in the agglomerate core.

DETAILED DESCRIPTION OF THE INVENTION

As already mentioned above, the boron nitride agglomerates according to the invention are agglomerates of platelet-shaped, hexagonal boron nitride primary particles, wherein the hexagonal boron nitride primary particles are connected to one another by means of an inorganic binding phase. The inorganic binding phase comprises at least one nitride and/or oxynitride. The nitrides or oxynitrides are preferably compounds of the elements aluminum, silicon, titanium and boron.

Examples of the compounds contained in the binding phase are aluminum nitride, aluminum oxynitride, silicon nitride, silicon oxynitride (for example $Si_2N_2O$), titanium nitride or also mixed nitrides or oxynitrides such as, for example sialons (for example $Si_3Al_3O_3N_5$). The binding phase may also comprise boron nitride or boron oxynitride. Mixtures of the above compounds are also possible.

The nitrides and oxynitrides contained in the binding phase are preferably aluminum nitride (AlN) and/or aluminum oxynitride and/or boron nitride.

The binding phase particularly preferably contains aluminum nitride and/or aluminum oxynitride.

The aluminum oxynitride may have different compositions; for example, the binding phase may contain aluminum oxynitride having the compositions $Al_8O_3N_6$ and $Al_5O_6N$, but other stoichiometries are also possible.

The nitrides and oxynitrides of the binding phase may be amorphous, partially crystalline or fully crystalline. The binding phase is preferably fully crystalline, since this makes it possible to achieve higher thermal conductivity values in the polymer-boron nitride composite materials.

The nitridic binding phase may additionally also contain oxidic phases such as, for example, boron oxide ($B_2O_3$), aluminum oxide ($Al_2O_3$), silicon dioxide ($SiO_2$), titanium dioxide ($TiO_2$), yttrium oxide ($Y_2O_3$), magnesium oxide (MgO), calcium oxide (CaO) and rare earth metal oxides.

Furthermore, the binding phase may additionally also contain borates, for example aluminum borates or calcium borates.

Due to manufacturing conditions during the reduction-nitridation process, the binding phase may also contain residual carbon or small amounts of carbides. In addition, carbon may also be contained that is not residual carbon due to manufacturing conditions, but rather also carbon that may be present in the form of graphite, for example. In addition, the binding phase may also contain metallic impurities, for example in the form of residual amounts of metallic binding phase raw materials (such as aluminum, silicon or titanium) not completely reacted during nitridation. The proportion of metallic phases and carbon is preferably less than 10% by weight, more preferably less than 5% by weight, based on the total agglomerate. The binding phase may also contain elemental boron, borides, boron carbide or other carbides such as, for example, silicon carbide. The proportion of boron, borides, boron carbide or other carbides is preferably less than 10% by weight, more preferably less than 5% by weight, based on the total agglomerate.

The proportion of nitrides and oxynitrides in the binding phase is preferably at least 50% by weight, particularly preferably at least 80% by weight, based on the total weight of the binding phase.

The binding phase is located between the boron nitride primary particles in the agglomerates, but it may also be located, at least partially, on the surface of the agglomerates or cover the majority of the surface area.

The binding phase binds the boron nitride primary particles in the agglomerate, making it possible to obtain mechanically more stable agglomerates compared with binder-free agglomerates.

The stability of the agglomerates may be tested, for example, in ultrasound experiments while simultaneously determining the agglomerate size via laser granulometry, wherein the agglomerate disintegrates over time due to the effect of the ultrasound. The temporal disintegration of the agglomerate size is recorded, wherein different curves develop depending on the stability of the agglomerate. In this, soft agglomerates disintegrate faster than mechanically more stable agglomerates.

The agglomerate density of the agglomerates according to the invention, which may be measured by means of geometric density determination of pressed nitrided powder articles, is preferably at least 0.3% of the theoretical density.

Depending on the production method, the agglomerates according to the invention may be roundish to spherical or blocky and angular. Agglomerates produced by spray-drying retain their roundish to spherical shape even after nitridation. The agglomerates produced via compaction and comminution are rather blocky or chunky, angular or square in shape.

The boron nitride primary particles are randomly distributed in the agglomerates according to the invention, wherein short range-order may exist in local regions.

In the agglomerates according to the invention, the boron nitride platelets are substantially oriented toward each other without a preference in any particular direction, resulting in the agglomerates according to the invention having substantially isotropic properties.

The isotropy of the boron nitride agglomerates, i.e. the degree of random orientation of the platelet-shaped boron nitride primary particles in the agglomerates according to the invention, may be characterized by the texture index. The texture index of hexagonal boron nitride with isotropic orientation of the platelet-shaped boron nitride primary particles (hence, without a preference in any particular direction) is 1. The texture index rises with decreasing isotropy, i.e. for boron nitride agglomerates with an increased degree of orientation of the platelet-shaped boron nitride primary particles to each other. The agglomerates according to the invention preferably have a texture index of less than 5, more preferably less than 3.5.

The texture index is determined with X-ray diffractometry. To this end, the ratio of the intensities of the (002) and (100) reflexes is determined by measuring the X-ray diffraction diagrams and divided by the corresponding ratio for an ideal, non-textured hBN sample. This ideal ratio may be determined from the JCPDS data, and it is 7.29.

The texture index (TI) may thus be calculated according to the formula $$TI = \frac{I_{(002),sample} / I_{(100),sample}}{I_{(002),theoretical} / I_{(100),theoretical}} = \frac{I_{(002),sample} / I_{(100),sample}}{7.29}$$

The agglomerates according to the invention preferably have an average agglomerate size ($d_{50}$) of 1 mm or less, more preferably 500 μm or less, even more preferably 300 μm or less and particularly preferably 200 μm or less (wet measurement, Mastersizer 2000, Malvern, Germany).

The specific surface area (BET) of the agglomerates according to the invention is preferably 20 m²/g or less, more preferably 10 m²/g or less. However, the specific surface area may also assume values of above 20 m²/g.

The proportion of the nitridic binding phase in the boron nitride agglomerates according to the invention is preferably at least 0.5% by weight, more preferably at least 1% by weight, even more preferably at least 5% by weight and particularly preferably at least 10% by weight. The proportion of the nitridic binding phase in the boron nitride agglomerates according to the invention is preferably no more than 60% by weight, more preferably no more than 50% by weight, in each case based on the total weight of the agglomerates.

The average particle size of the platelet-shaped boron nitride primary particles in the boron nitride agglomerates according to the invention is preferably 1-25 μm, more preferably 1-10 μm.

For producing the boron nitride agglomerates according to the invention, boron nitride starting powder is mixed with binding phase raw materials. From this mixture, in a shaping step, granules or shaped articles are produced which are subsequently subjected to a temperature treatment in a nitriding atmosphere. If necessary, the obtained granules or shaped articles may subsequently also be further comminuted and/or fractionated.

Hexagonal boron nitride, amorphous boron nitride, partially crystalline boron nitride and mixtures thereof may be used as the boron nitride starting powder for producing the boron nitride agglomerates according to the invention.

The average particle size $d_{50}$ of the boron nitride powder that is used may be 0.5-50 μm, preferably 0.5-15 μm, more preferably 0.5-5 μm. For instance, hexagonal boron nitride powders having an average particle size of 1 μm, 3 μm, 6 μm, 9 μm and 15 μm may be used, but greater average particle sizes of up to 50 μm are also possible. Mixtures of different hexagonal boron nitride powders with different particle sizes may likewise be used. Measuring the average particle size ($d_{50}$) of the boron nitride powders that are used is typically carried out by means of laser diffraction (wet measurement, Mastersizer 2000, Malvern).

$B_2O_3$-free boron nitride powders and boron nitride powders with lower $B_2O_3$ contents of up to 0.5% by weight, but also with higher $B_2O_3$ contents of up to 10% by weight and more, may be used.

It is also possible to use mixtures of powdered or granulated boron nitride.

The binding phase raw materials may be present in solid or liquid or paste-like form.

Mixing boron nitride starting powder and binding phase raw materials may be carried out in a mixing drum, in a V-mixer, a drum hoop mixer, a vibrating mill or an Eirich mixer, for example. Homogeneity may be further increased in a following milling step (e.g. cross beater mill, tumbling mill, agitator ball mill). The powder mixture may be dry or moistened. It is likewise possible to add pressing aids and, if necessary, lubricating aids. Mixing may also be carried out wet, for example if the subsequent production of the granules is carried out via spray-drying or build-up granulation.

Shaping may take place by compacting the dried or moistened powder mixture into plates or tablets by means of uniaxial compression, isostatic compression or roller compaction. Shaping methods that are likewise possible are granulation methods such as spray granulation or build-up granulation. The residual moisture of the produced shaped articles or granules may be driven out prior to nitridation via a temperature treatment at approximately 100° C.

The dried shaped articles or granules are subjected to a temperature treatment in a nitriding atmosphere at temperatures of at least 1000° C., preferably at least 1400° C., more preferably at least 1600° C. The nitriding atmosphere preferably comprises nitrogen and/or ammonia. Due to the temperature treatment in the nitriding atmosphere, a nitridic binding phase develops which connects the boron nitride primary particles to one another. Due to the nitriding step, the degree of crystallization of the primary particles may increase, which is associated with primary particle growth.

In a first embodiment (direct nitridation), metal powders are used as binding phase raw materials for producing the nitridic binding phase, preferably selected from the group comprising aluminum, silicon, titanium and mixtures thereof. In the nitriding step, the metal is converted into the corresponding metal nitride. It is also possible that oxynitrides or mixtures of metal nitrides and oxynitrides develop during nitridation.

In a second embodiment (reduction-nitridation), metal compounds are used as the binding phase raw materials in combination with reducing agents for producing the nitridic binding phase. Compounds of the elements aluminum, silicon and titanium—preferably oxides and/or hydroxides such as, for example, aluminum oxide ($Al_2O_3$), aluminum hydroxide ($Al(OH)_3$), boehmite (AlOOH), silicon dioxide ($SiO_2$) and titanium dioxide ($TiO_2$)—are advantageously used as metal compounds. Borates, for example aluminum borate, may also be used as metal compounds. Carbon and hydrogen as well as organic compounds such as, for example, polyvinyl butyral (PVB), melamine and methane may be used as reducing agents. If gaseous substances such as, for example, hydrogen or methane are used as reducing agents, these substances are added to the nitriding atmosphere. The reducing agent necessary for the reduction may also already be present in the metal compound, thus making the use of additional reducing agents unnecessary, for example when using aluminum isopropoxide, tetraethylorthosilicate or titanium isopropoxide. In the nitriding step, the metal compounds are converted into the corresponding metal nitrides. It is also possible that during nitridation, oxynitrides or, respectively, mixtures of metal nitrides and oxynitrides develop; likewise, the binding phase may still contain residues of unreacted oxides.

In a third embodiment, reactants for producing boron nitride may be used as binding phase raw materials for producing the nitridic binding phase. The reactants for producing boron nitride may contain an oxidic boron source such as, for example, boric acid ($H_3BO_3$) and boron oxide ($B_2O_3$) in combination with a reducing agent such as, for example, carbon or hydrogen or organic compounds such as polyvinyl alcohol (PVA), polyvinyl butyral (PVB), melamine and methane. If gaseous substances such as, for example, hydrogen or methane are used as reducing agents, these substances are added to the nitriding atmosphere. As reactants for producing boron nitride, substantially oxygen-free boron sources such as, for example, elemental boron, boron carbide and trimethyl borate may also be used. In the nitriding step, these raw materials are converted to hexagonal boron nitride.

In a fourth embodiment, nitridic materials which solidify during the heat treatment in the nitriding atmosphere may be used as binding phase raw materials. The nitridic material may be a nitride and/or oxynitride compound of aluminum or silicon, but titanium nitride and rare earth nitrides may also be used; likewise, compounds from the group of sialons. Liquid phases such as, for example, yttrium oxide, aluminum oxide, magnesium oxide, calcium oxide, silicon oxide and rare earth oxides may be used as sintering aids.

It is also possible to combine the different embodiments with one another; for instance, the first embodiment may be combined with the fourth embodiment.

The reaction-bonded embodiments one to three are preferred embodiments, more preferred are embodiments one and two; the first embodiment is particularly preferred.

After the temperature treatment in the nitriding atmosphere, the shaped articles or granules are broken or fractionated, if necessary, to the desired agglomerate size in a subsequent comminution and/or fractionation step, thus producing the nitride-bonded agglomerates according to the invention. The comminution step after nitridation is omitted if the final agglomerate size was already set when the raw materials were granulated, for example when granulation is carried out by means of spray-drying or build-up granulation.

The target size for the agglomerate size depends mainly on the use in each case. If it is used as filler for polymers, it depends, for example, on the intended processing technique and the sought filler loading, wherein the properties of each synthetic material and processing parameters such as, for example, viscosity must be taken into consideration, and may be adjusted to each condition of use such as, for example, when used as filler for thermoplasts; as filler for duroplasts; for processing through injection molding; extrusion; casting; stamping or pressing and film production.

The BN-based fillers and filler combinations with additional fillers according to the invention may be incorporated into different matrix materials. Particularly preferred in this case are polymers such as duroplasts, thermoplasts and silicones. Examples of usable duroplasts are epoxides, cross-linked polyacrylates and polyurethanes; examples of thermoplasts are polyamide (PA), polyphenyl sulfide (PPS), polycarbonate (PC), polypropylene (PP), thermoplastic elastomers (TPE), thermoplastic polyurethane elastomers (TPU) and polyether ether ketones (PEEK).

The polymer-boron nitride composite materials according to the invention are premixed products which are present, for example, in granular form and which are further processed into other materials and shaped articles according to conventional methods, for example by extrusion methods. Here, the shaped articles thus produced are also referred to as polymer-boron nitride composite materials.

To achieve the target agglomerate size, typical steps such as sifting, comminution sieving and screening may be taken. If fine fractions are contained, they may be removed first. As an alternative to sieving, the defined comminution of the agglomerates may also be carried out with sieve graters, classifier mills, structured roller crushers or cutting wheels. Dry-milling, for instance in a ball mill, is also possible.

Following their production, the boron nitride agglomerates according to the invention may also be subjected to other treatments.

In this, for example, one or more of the following possible treatments may be carried out:

a temperature treatment under oxygen that results in surface oxidation of the agglomerates according to the invention. For instance, agglomerates with superficial $TiO_2$ may be produced by oxidizing agglomerates with a TiN-containing binding phase at 500° C.; superficial $SiO_2$ may be produced with a $Si_3N_4$-containing binding phase and superficial $Al_2O_3$ may be produced with an AlN-containing binding phase.
  a water vapor treatment
  a surface modification with silanes, titanates or other organometallic compounds, either at room temperature or under the influence of temperature and with carrier or reaction gases
  a surface modification with polymers, for example with polyethylene glycol (PEG), polyvinyl alcohol (PVA), polyvinyl butyral (PVB), polyvinyl pyrrolidone (PVP), copolymers, acrylates, oils or carboxylic acids
  an infiltration with sol-gel systems, for example with boehmite sol or $SiO_2$ sol, or with water-soluble glasses or nanoparticles or surface-modified nanoparticles or mixtures thereof.

The listed surface treatments may also be carried out for mixtures of agglomerates according to the invention with other boron nitride fillers.

It is also possible to combine several of the listed treatments in any order. For example, the treatments may be carried out in fluidized bed methods.

If it is used as filler for polymers, the described treatments achieve improved coupling of the polymer matrix with the nitride-bonded agglomerates according to the invention.

As previously mentioned, the agglomerates according to the invention may be used as filler for polymers and be processed into polymer-boron nitride composite materials. For producing the filled polymers, mixtures of the agglomerates according to the invention may also be used with other known fillers for polymers such as, for example, carbon, graphite, expanded graphite, aluminum oxide, aluminum nitride and silicon dioxide, for example in the form of fibers, spheres or platelets. Mixtures of different fractions of agglomerates according to the invention may likewise be used for producing the filled polymers, as well as mixtures of such fractions with primary particle fractions of boron nitride, hence, with platelet-shaped boron nitride particles or with platelet-shaped agglomerates of boron nitride particles. These boron nitride mixtures may likewise be used as a mixture with other known fillers for polymers.

The agglomerates according to the invention may also be employed for other uses, for instance for producing sintered bodies.

EXAMPLES AND COMPARATIVE EXAMPLES

Example 1

990 g hexagonal boron nitride powder having a primary particle size $d_{50}$ of 3 μm (BORO-NID® S1, from ESK Ceramics GmbH & Co. KG, Germany; primary particle size measured by laser diffraction (Mastersizer 2000, Malvern, wet measurement)) is mixed with 10 g aluminum powder <100 μm (aluminum grit, from Eckart GmbH & Co. KG, Velden, Germany) and homogenized with grinding balls in a PE bottle on a roller block for 12 hours. The powder mixture is compacted in a roller compactor (RC 100, from Powtec GmbH, Remscheid, Germany). The force with which the rollers are pressed together during the compacting process is 49 kN. The surface of the rollers that are used is grooved, which causes the developing scabs to achieve a thickness of 0.4 to 1.6 mm. The scabs are comminuted in the integrated sieve grater having a 1 mm mesh size. The resulting granules are processed once more under the same conditions, wherein scabs having a basic surface area of approximately 3 cm$^2$ and a thickness of 0.4 to 1.6 mm are obtained by bypassing the sieve grater.

Nitridation of the binding phase is carried out at 2050° C. for 2 hours in a flowing nitrogen atmosphere. This is heated at 17.5° C./min until the final temperature of 2050° C. is reached. The obtained nitride-bonded BN scabs are comminuted by sieving to a size of <200 μm.

In addition to hexagonal boron nitride as the main phase, it is possible to detect aluminum nitride on the obtained boron nitride agglomerates with X-ray diffractometry.

The nitride-bonded boron nitride agglomerates <200 μm thus produced are homogenized for 30 seconds at 3000 RPM with a proportion of 40% by volume in epoxy resin and curing agent (Epofix, Struers GmbH, Willich, Germany) in a planetary mixer (high-speed mixer DAC 150.1, from Hauschild, Hamm, Germany). The mixture is cured for 12 hours at room temperature and for a further 12 hours at 80° C. A sample with the dimensions 10*10*2 mm$^3$ is produced from the cured compound via mechanical processing (sawing and milling/grinding). The thermal conductivity (TC) is determined by measuring the values for thermal diffusivity a, specific thermal capacity $c_p$ and density D, and is calculated from these values according to the equation $$TC = a * c_p * D.$$

Values for a and $c_p$ are measured with the Nanoflash LFA 447 (Netzsch, Selb, Germany) on samples of size 10*10*2 mm$^3$ near room temperature. Density is calculated by weighing and determining the geometrical dimensions of the precisely shaped samples. Table 2 lists the obtained measured value for thermal conductivity.

Incorporating the boron nitride agglomerates according to the invention into the filled epoxide samples for determining the thermal conductivity is carried out as described above with a proportion of 40% by volume. This was also maintained, as far as possible, for the other examples in order to make it possible to better compare the thermal conductivity values obtained with the different boron nitride agglomerates, since the nitride-bonded boron nitride agglomerates have different values for the theoretical density due to different proportions of the binding phase. To calculate the theoretical densities, in order to simplify the calculation the assumption was made that the binding phase raw materials that were used are completely converted into the corresponding nitrides (AlN or TiN or Si$_3$N$_4$). The data in table 2 in the column "binding phase amount" are the calculated values obtained with this assumption.

From the produced nitride-bonded boron nitride agglomerates <200 μm, the fines <100 μm are separated by sieving. The agglomerate stability is determined by means of a laser granulometer (Mastersizer 2000 with dispersing unit Hydro 2000S, Malvern, Herrenberg, Germany) on the 100-200 μm sieve fraction of nitride-bonded agglomerates thus obtained. To this end, a solution consisting of a wetting agent in water (mixture of 2 mL of a rinsing agent (G 530 Spülfix, BUZIL-Werk Wagner GmbH & Co. KG, Memmingen) and 0.375 mL Imbentin (polyethylene glycol alkyl ether) in 10 L distilled water) is used as the dispersing medium. 10-20 mg of the agglomerates is dispersed with 6 mL of the dispersing medium in a vial with snap-on cap (8 mL) by shaking. Suspension is removed from the sample with a pipette and dropped into the wet cell of the laser granulometer until the laser obscuration reaches 5% (specified range: 5-30%). Measurement starts without ultrasound, and every 15 seconds, a further measurement is taken with ultrasound, in which the ultrasonic power of the dispersing unit (which may be set via the device software to values between 0 and 100%) is set to 5% of the maximum power in each case. A total of ten measurements is taken. The stirrer of the dispersing unit runs at 1750 RPM during the measurements. The quotient of the $d_{90}$ value after the ten measurements and the $d_{90}$ value of the first measurement is used (multiplied by 100 to express in percent) as a measure of agglomerate stability.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), agglomerate stability of the agglomerates according to the invention and thermal conductivity of the 40% by volume filled epoxy compound.

Example 2

950 g hexagonal boron nitride powder having a primary particle size $d_{50}$ of 3 μm (BORO-NID® S1, from ESK Ceramics GmbH & Co. KG, Germany; primary particle size measured by laser diffraction (Mastersizer 2000, Malvern, wet measurement)) is mixed with 50 g aluminum powder (aluminum grit, Grade AS2WA1, from Eckart GmbH & Co. KG, Velden, Germany) and homogenized with grinding balls in a PE bottle on a roller block for 12 hours. The powder mixture is compacted in a roller compactor (RC 100, from Powtec GmbH, Remscheid, Germany). The force with which the rollers are pressed together during the compacting process is 49 kN. The surface of the rollers that are used is grooved, which causes the developing scabs to achieve a thickness of 0.4 to 1.6 mm. The scabs are comminuted in the integrated sieve grater having a 1 mm mesh size. The resulting granules are processed once more under the same conditions, wherein scabs having a basic surface area of approximately 3 cm$^2$ and a thickness of 0.4 to 1.6 mm are obtained by bypassing the sieve grater.

Nitridation of the binding phase is carried out at 1600° C. for 2 hours in a flowing nitrogen atmosphere. This is heated at 17.5° C./min until the final temperature of 1600° C. is reached. The obtained nitride-bonded BN scabs are comminuted by sieving to a size of <200 μm.

In addition to hexagonal boron nitride as the main phase, it is possible to detect aluminum nitride on the obtained boron nitride agglomerates with X-ray diffractometry.

As described in example 1, a sample for determining the thermal conductivity is produced (with 40% by volume of the produced boron nitride agglomerates <200 µm in epoxide).

From the produced nitride-bonded boron nitride agglomerates <200 µm, the fines <100 µm are separated by sieving. The agglomerate stability is determined by means of laser granulometry on the 100-200 µm sieve fraction of the nitride-bonded agglomerates thus obtained, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 3

Example 2 is repeated; however, nitridation is carried out at 1950° C. for two hours in flowing nitrogen.

In addition to hexagonal boron nitride as the main phase, it is possible to detect aluminum nitride on the obtained boron nitride agglomerates with X-ray diffractometry.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 4

Example 2 is repeated; however, nitridation is carried out at 2050° C. for two hours in flowing nitrogen.

In addition to hexagonal boron nitride as the main phase, it is possible to detect aluminum nitride on the obtained boron nitride agglomerates with X-ray diffractometry.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 5

900 g hexagonal boron nitride powder having a primary particle size $d_{50}$ of 3 µm (BORO-NID® S1, from ESK Ceramics GmbH & Co. KG, Germany; primary particle size measured by laser diffraction (Mastersizer 2000, Malvern, wet measurement)) is mixed with 100 g aluminum powder (aluminum grit, Grade AS2WA1, from Eckart GmbH & Co. KG, Velden, Germany) and homogenized with grinding balls in a PE bottle on a roller block for 12 hours. The powder mixture is compacted in a roller compactor (RC 100, from Powtec GmbH, Remscheid, Germany). The force with which the rollers are pressed together during the compacting process is 49 kN. The surface of the rollers that are used is grooved, which causes the developing scabs to achieve a thickness of 0.4 to 1.6 mm. The scabs are comminuted in the integrated sieve grater having a 1 mm mesh size. The resulting granules are processed once more under the same conditions, wherein scabs having a basic surface area of approximately 3 cm² and a thickness of 0.4 to 1.6 mm are obtained by bypassing the sieve grater. Nitridation of the binding phase is carried out at 1600° C. for 2 hours in a flowing nitrogen atmosphere. This is heated at 17.5° C./min until the final temperature of 1600° C. is reached. The obtained nitride-bonded BN scabs are comminuted by sieving to a size of <200 µm.

In addition to hexagonal boron nitride as the main phase, it is possible to detect aluminum nitride on the obtained boron nitride agglomerates with X-ray diffractometry.

As described in example 1, a sample for determining the thermal conductivity is produced (with 40% by volume of the produced boron nitride agglomerates <200 µm in epoxide).

From the produced nitride-bonded boron nitride agglomerates <200 µm, the fines <100 µm are separated by sieving. The agglomerate stability is determined by means of laser granulometry on the 100-200 µm sieve fraction of the nitride-bonded agglomerates thus obtained, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 6

Example 5 is repeated; however, nitridation is carried out at 1950° C. for two hours in flowing nitrogen.

In addition to hexagonal boron nitride as the main phase, it is possible to detect aluminum nitride on the obtained boron nitride agglomerates with X-ray diffractometry.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 7

Example 5 is repeated; however, nitridation is carried out at 2050° C. for two hours in flowing nitrogen.

In addition to hexagonal boron nitride as the main phase, it is possible to detect aluminum nitride on the obtained boron nitride agglomerates with X-ray diffractometry.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 8

700 g hexagonal boron nitride powder having a primary particle size $d_{50}$ of 3 µm (BORO-NID® S1, from ESK Ceramics GmbH & Co. KG, Germany; primary particle size measured by laser diffraction (Mastersizer 2000, Malvern, wet measurement)) is mixed with 300 g aluminum powder (aluminum grit, Grade AS2WA1, from Eckart GmbH & Co. KG, Velden, Germany) and homogenized with grinding balls in a PE bottle on a roller block for 12 hours. The powder mixture is compacted in a roller compactor (RC 100, from Powtec GmbH, Remscheid, Germany). The force with which the rollers are pressed together during the compacting process is 49 kN. The surface of the rollers that are used is grooved, which causes the developing scabs to achieve a thickness of 0.4 to 1.6 mm. The scabs are comminuted in the integrated sieve grater having a 1 mm mesh size. The resulting granules are processed once more under the same conditions, wherein scabs having a basic surface area of approximately 3 $cm^2$ and a thickness of 0.4 to 1.6 mm are obtained by bypassing the sieve grater. Nitridation of the binding phase is carried out at 1600° C. for 2 hours in a flowing nitrogen atmosphere. This is heated at 17.5° C./min until the final temperature of 1600° C. is reached. The obtained nitride-bonded BN scabs are comminuted by sieving to a size of <200 μm.

In addition to hexagonal boron nitride as the main phase, it is possible to detect aluminum nitride on the obtained boron nitride agglomerates with X-ray diffractometry.

As described in example 1, a sample for determining the thermal conductivity is produced (with 40% by volume of the produced boron nitride agglomerates <200 μm in epoxide).

From the produced nitride-bonded boron nitride agglomerates <200 μm, the fines <100 μm are separated by sieving. The agglomerate stability is determined by means of laser granulometry on the 100-200 μm sieve fraction of the nitride-bonded agglomerates thus obtained, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 9

Example 8 is repeated; however, nitridation is carried out at 1950° C. for two hours in flowing nitrogen.

In addition to hexagonal boron nitride as the main phase, it is possible to detect aluminum nitride on the obtained boron nitride agglomerates with X-ray diffractometry.

An Al determination was carried out on the obtained boron nitride agglomerates. The obtained measured value is 26.0% by weight, which corresponds to a proportion of 39.5% by weight aluminum nitride in the agglomerates. From the Al analysis, it may be assumed that the used aluminum powder is completely converted to aluminum nitride, and that no aluminum evaporated during nitridation (30% by weight aluminum in the starting mixture corresponds to 26% by weight aluminum in the nitrided agglomerates when the aluminum is completely nitrided).

The aluminum content is determined by alkali melt fusion and ICP OES measurement. In doing so, the aluminum content as the main constituent is measured in the percent range as follows: coarse or lumpy sample material should be comminuted with a suitable mill to a grain size of <150 μm (<100 mesh). The devices and methods used for this procedure should be selected such that introduced contaminations do not affect the accuracy and precision of the measurement.

The sample fusion is carried out by alkali melt fusion. For this purpose, a sub-sample of about 200 mg is precisely weighed to the nearest 0.01 mg and placed in a platinum crucible, mixed with about 3 g sodium/potassium carbonate, covered with an additional 2 g sodium/potassium carbonate layer, and the platinum lid is placed on top. The crucible is heated on a Bunsen burner until a clear melt develops. The cooled melt is dissolved with 20 mL hydrochloric acid (concentration about 10 mol/L), the solution is transferred into a 250 mL graduated flask, and the flask is filled with water to the mark.

The aluminum concentration of the sample solution is measured by means of ICP OES. This is calibrated against matrix-matched aqueous calibration solutions with known aluminum concentration. The method blank value should be measured by using the same procedure, but without a sample. The aluminum content of the sample is calculated, taking into account the volume of the sample solution, the sample weight and the method blank value.

As described in example 1, a sample for determining the thermal conductivity is produced (with 40% by volume of the produced boron nitride agglomerates <200 μm in epoxide).

From the produced nitride-bonded boron nitride agglomerates <200 μm, the fines <100 μm are separated by sieving. The agglomerate stability is determined by means of laser granulometry on the 100-200 μm sieve fraction of the nitride-bonded agglomerates thus obtained, as described in example 1.

The texture index (TI) was determined on the 100-200 μm sieve fraction of nitride-bonded agglomerates, which was 1.9. This value shows that the agglomerates are not strongly textured and are largely isotropic.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 10

Example 8 is repeated; however, nitridation is carried out at 2050° C. for two hours in flowing nitrogen.

In addition to hexagonal boron nitride as the main phase, it is possible to detect aluminum nitride on the obtained boron nitride agglomerates with X-ray diffractometry.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 11

950 g hexagonal boron nitride powder having a primary particle size $d_{50}$ of 3 μm (BORO-NID® S1, ESK Ceramics GmbH & Co. KG, Germany; primary particle size measured by laser diffraction (Mastersizer 2000, Malvern, wet measurement)) is mixed with 50 g aluminum powder (Grade Standard Pyro MT, Eckart GmbH & Co. KG, Velden, Germany) and homogenized with grinding balls in a PE bottle on a roller block for 12 hours. With the powder mixture, granules are produced in the roller compacter as described in example 1.

Nitridation of the binding phase is carried out at 1600° C. for 2 hours in a flowing nitrogen atmosphere. This is heated at 17.5° C./min until the final temperature of 1600° C. is reached. The obtained nitride-bonded BN scabs are comminuted by sieving to a size of <200 µm.

In addition to hexagonal boron nitride as the main phase, it is possible to detect aluminum nitride and the aluminum oxynitride $Al_8O_3N_6$ on the obtained boron nitride agglomerates with X-ray diffractometry.

As described in example 1, a sample for determining the thermal conductivity is produced (with 40% by volume of the produced boron nitride agglomerates <200 µm in epoxide).

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Examples 12-17

Example 11 is repeated; however, the proportion of aluminum powder (Grade Standard Pyro MT) in the powder mixture for producing the agglomerate and the nitriding temperature are varied, as per the data in table 1.

In addition to hexagonal boron nitride as the main phase, it is possible to detect aluminum nitride and the aluminum oxynitride $Al_8O_3N_6$ on the obtained boron nitride agglomerates with X-ray diffractometry.

An Al determination according to example 9 was carried out on the obtained boron nitride agglomerates of example 16. The obtained measured value is 23.1% by weight.

The texture index (TI) was determined on the 100-200 µm sieve fraction of nitride-bonded agglomerates from example 16; it was 1.8. This value shows that the agglomerates are not strongly textured and are largely isotropic.

Table 1 shows the compositions of the starting mixtures and the nitriding temperatures. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 18

950 g hexagonal boron nitride powder having a primary particle size $d_{50}$ of 3 µm (BORO-NID® S1, from ESK Ceramics GmbH & Co. KG, Germany; primary particle size measured by laser diffraction (Mastersizer 2000, Malvern, wet measurement)) is mixed with 50 g aluminum powder from the Al paste (Grade STAPA Alupor SK I-NE/75, from Eckart GmbH & Co. KG, Velden, Germany) and homogenized with grinding balls in a PE bottle on a roller block for 12 hours. With the powder mixture, granules are produced in the roller compacter as described in example 1.

Nitridation of the binding phase is carried out at 1950° C. for 2 hours in a flowing nitrogen atmosphere. This is heated at 17.5° C./min until the final temperature of 1950° C. is reached. The obtained nitride-bonded BN scabs are comminuted by sieving to a size of <200 µm.

In addition to hexagonal boron nitride as the main phase, it is possible to detect aluminum nitride on the obtained boron nitride agglomerates with X-ray diffractometry.

As described in example 1, a sample for determining the thermal conductivity is produced (with 40% by volume of the produced boron nitride agglomerates <200 µm in epoxide).

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Examples 19-24

Example 18 is repeated; however, the proportion of aluminum powder (Grade STAPA Alupor SK I-NE/75) in the powder mixture for producing the agglomerate and the nitriding temperature are varied, as per the data in table 1.

In addition to hexagonal boron nitride as the main phase, it is possible to detect aluminum nitride on the obtained boron nitride agglomerates with X-ray diffractometry.

An Al determination according to example 9 was carried out on the obtained boron nitride agglomerates of example 23. The obtained measured value is 26.4% by weight.

The texture index (TI) was determined on the 100-200 µm sieve fraction of nitride-bonded agglomerates from example 23; it was 2.7. This value shows that the agglomerates are not strongly textured and are largely isotropic.

Table 1 shows the compositions of the starting mixtures and the nitriding temperatures. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 25

900 g hexagonal boron nitride powder having a primary particle size $d_{50}$ of 3 µm (BORO-NID® S1, from ESK Ceramics GmbH & Co. KG; particle size measured with Mastersizer 2000, Malvern, wet measurement) is mixed with 100 g $TiO_2$ nanopowder (Hombitech, Sachtleben, Duisburg, Germany) and homogenized with grinding balls in a PE bottle on a roller block for 12 hours. With the powder mixture, granules are produced in the roller compacter as described in example 1.

Nitridation of the binding phase is carried out at 1950° C. for 2 hours in a flowing nitrogen atmosphere. This is heated at 17.5° C./min until the final temperature of 1950° C. is reached. The obtained nitride-bonded BN scabs are comminuted by sieving to a size of <200 µm.

In addition to hexagonal boron nitride as the main phase, it was possible to detect the binding phases TiN and $TiB_2$ in X-ray diffraction tests.

As described in example 1, a sample for determining the thermal conductivity is produced (with 40% by volume of the produced boron nitride agglomerates <200 µm in epoxide).

The agglomerate stability is determined on the 100-200 µm sieve fraction of the nitride-bonded agglomerates, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 26

Example 25 is repeated; however, $TiB_2$ is used as the Ti-containing binding phase raw material. The average particle sizes $d_{50}$ of the $TiB_2$ powder (ESK GmbH & Co. KG) that is used is 16.5 μm, the proportion of $TiB_2$ in the powder mixture is 10% by weight.

After nitridation, it was possible to detect the binding phases TiN and $TiB_2$ in X-ray diffraction tests, in addition to hexagonal boron nitride as the main phase.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 27

Example 25 is repeated; however, Ti powder is used as the binding phase raw material (Fine Powder 98+, No. 1.12379.0250, Merck, Darmstadt, Germany).

After nitridation, it was possible to detect the binding phases TiN and $TiB_2$ in X-ray diffraction tests, in addition to hexagonal boron nitride as the main phase.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 28

900 g amorphous boron nitride powder having a total oxygen content of 8% by weight (from ESK Ceramics GmbH & Co. KG) is mixed with 100 g $TiO_2$ nanopowder (Hombitech, Sachtleben, Duisburg, Germany) and homogenized with grinding balls in a PE bottle on a roller block for 12 hours. With the powder mixture, granules are produced in the roller compacter as described in example 1.

Nitridation of the binding phase is carried out at 1950° C. for 2 hours in a flowing nitrogen atmosphere. This is heated at 17.5° C./min until the final temperature of 1950° C. is reached. The obtained nitride-bonded BN scabs are comminuted by sieving to a size of <200 μm.

In addition to hexagonal boron nitride as the main phase, it was possible to detect the binding phases TiN and $TiB_2$ in X-ray diffraction tests.

Scanning electron microscope (SEM) tests were able to verify that nitridation annealing caused strong crystal growth of the boron nitride. The average primary particle size of the hexagonal boron nitride in the agglomerates detectable in the SEM is approximately 12-15 μm.

In contrast, crystal growth could not be observed in the examples which already used crystalline, hexagonal boron nitride (all examples with the exception of examples 28 to 30).

As described in example 1, a sample for determining the thermal conductivity is produced (with 40% by volume of the produced boron nitride agglomerates <200 μm in epoxide).

The agglomerate stability is determined on the 100-200 μm sieve fraction of the nitride-bonded agglomerates, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 29

Example 28 repeated; however, $TiB_2$ is used as the Ti-containing binding phase raw material. The average particle sizes $d_{50}$ of the used $TiB_2$ powder (ESK GmbH & Co. KG) is 16.5 μm, the proportion of $TiB_2$ in the powder mixture is 10% by weight.

After nitridation, it was possible to detect the binding phases TiN and $TiB_2$ in X-ray diffraction tests, in addition to hexagonal boron nitride as the main phase.

As in example 28, scanning electron microscope (SEM) tests were able to verify that nitridation annealing caused strong crystal growth of the boron nitride. The average primary particle size of the hexagonal boron nitride in the agglomerates detectable in the SEM is approximately 12-15 μm.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 30

Example 28 is repeated; however, Ti powder is used as the binding phase raw material (Fine Powder 98+, No. 1.12379.0250, Merck, Darmstadt, Germany).

After nitridation, it was possible to detect the binding phases TiN and $TiB_2$ in X-ray diffraction tests, in addition to hexagonal boron nitride as the main phase.

As in example 28, scanning electron microscope (SEM) tests were able to verify that nitridation annealing caused strong crystal growth of the boron nitride. The average primary particle size of the hexagonal boron nitride in the agglomerates detectable in the SEM is approximately 12-15 μm.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates according to the invention and the thermal conductivity of the 40% by volume filled epoxy compound.

Example 31

860 g hexagonal boron nitride powder having a primary particle size $d_{50}$ of 3 μm (BORO-NID® S1, from ESK Ceramics GmbH & Co. KG; primary particle size measured with Mastersizer 2000, Malvern, wet measurement) is mixed with 140 g aluminum nitride powder (Grade B, $d_{50}$=3.4 µm, H.C. Starck) and homogenized with grinding balls in a PE bottle on a roller block for 12 hours. With the powder mixture, granules are produced in the roller compacter as described in example 1.

The temperature treatment of the granules is carried out at 1950° C. for 2 hours in a flowing nitrogen atmosphere. This is heated at 17.5° C./min until the final temperature of 1950° C. is reached. The obtained annealed nitride-bonded BN scabs are comminuted by sieving to a size of <200 µm.

As described in example 1, a sample for determining the thermal conductivity is produced (with 40% by volume of the produced boron nitride agglomerates <200 µm in epoxide).

The agglomerate stability is determined on the 100-200 µm sieve fraction of the nitride-bonded agglomerates, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 32

550 g hexagonal boron nitride powder having a primary particle size $d_{50}$ of 3 µm (BORO-NID® S1, from ESK Ceramics GmbH & Co. KG, Germany; primary particle size measured by laser diffraction (Mastersizer 2000, Malvern, wet measurement)) is mixed with 450 g aluminum powder from the Al paste (Grade STAPA Alupor SK I-NE/75, from Eckart GmbH & Co. KG, Velden, Germany) and homogenized with grinding balls in a PE bottle on a roller block for 12 hours. With the powder mixture, granules are produced in the roller compacter as described in example 1.

Nitridation of the binding phase is carried out at 1950° C. for 2 hours in a flowing nitrogen atmosphere. The obtained nitride-bonded BN scabs are comminuted by sieving to a size of <200 µm.

In addition to hexagonal boron nitride, it is possible to detect aluminum nitride on the obtained boron nitride agglomerates with X-ray diffractometry.

As described in example 1, a sample for determining the thermal conductivity is produced (with 40% by volume of the produced boron nitride agglomerates <200 µm in epoxide).

The agglomerate stability is determined on the 100-200 µm sieve fraction of the nitride-bonded agglomerates, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Examples 33 and 34

Examples 33 and 34 were produced according to example 32, wherein the amount of binding phase raw material is varied as specified in table 1. The binding phase raw materials are converted to a nitridic binding phase at 1950° C. according to example 32.

Table 1 shows the compositions of the starting mixtures and the nitriding temperatures. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Example 35

700 g hexagonal boron nitride powder having a primary particle size $d_{50}$ of 12 µm (ESK Ceramics GmbH & Co. KG; primary particle size measured by laser diffraction (Mastersizer 2000, Malvern, wet measurement)) is mixed with 300 g aluminum powder from the Al paste (Grade STAPA Alupor SK I-NE/75, from Eckart GmbH & Co. KG, Velden, Germany) and homogenized with grinding balls in a PE bottle on a roller block for 12 hours. With the powder mixture, granules are produced in the roller compacter as described in example 1.

Nitridation of the binding phase is carried out at 1950° C. for 2 hours in a flowing nitrogen atmosphere. The obtained nitride-bonded BN scabs are comminuted by sieving to a size of <200 µm.

It is possible to detect aluminum nitride and hexagonal boron nitride on the obtained agglomerates with X-ray diffractometry.

As described in example 1, a sample for determining the thermal conductivity is produced (with 40% by volume of the produced boron nitride agglomerates <200 µm in epoxide).

The agglomerate stability is determined on the 100-200 µm sieve fraction of the nitride-bonded agglomerates, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 µm sieve fraction), the agglomerate stability of the agglomerates according to the invention and the thermal conductivity of the 40% by volume filled epoxy compound.

Comparative Example 1

1000 g hexagonal boron nitride powder having a primary particle size $d_{50}$ of 3 µm (BORONID® S1, ESK Ceramics GmbH & Co. KG; primary particle size measured with Mastersizer 2000, Malvern, wet measurement)) is homogenized with grinding balls in a PE bottle on a roller block for 12 hours. With the powder mixture, granules are produced in the roller compacter as described in example 1.

The temperature treatment of the scabs is carried out at 1600° C. for 2 hours in a flowing nitrogen atmosphere. This is heated at 17.5° C./min until the final temperature of 1600° C. is reached. The obtained BN scabs are comminuted by sieving to a size of <200 µm.

The boron nitride agglomerates <200 µm thus produced are homogenized for 30 seconds at 3000 RPM with a proportion of 40% by volume in epoxy resin and curing agent (Epofix, Struers GmbH, Willich, Germany) in a planetary mixer (high-speed mixer DAC 150.1, from Hauschild, Hamm, Germany). The mixture is cured for 12 hours at room temperature and for a further 12 hours at 80° C.

A sample with the dimensions 10*10*2 mm³ is produced from the cured compound by mechanical processing (sawing and milling/grinding), on which sample thermal conductivity is determined as described in example 1.

From the produced boron nitride agglomerates <200 μm, the fines <100 μm are separated by sieving. The agglomerate stability is determined on the 100-200 μm sieve fraction of the boron nitride agglomerates thus obtained, as described in example 1.

Table 1 shows the composition of the starting mixture and the nitriding temperature. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates and the thermal conductivity of the 40% by volume filled epoxy compound.

Comparative Examples 2 and 3

Comparative examples 2 and 3 were produced according to comparative example 1; however, the temperature treatment was not carried out at 600° C., but at 1950° C. (comparative example 2) and 2050° C. (comparative example 3), in each case for 2 hours.

Table 1 shows the compositions of the starting mixtures and the nitriding temperatures. Table 2 shows the composition of the agglomerates, the $d_{50}$ and $d_{90}$ values of the agglomerate size distribution (Mastersizer, wet measurement without ultrasound on the 100-200 μm sieve fraction), the agglomerate stability of the agglomerates and the thermal conductivity of the 40% by volume filled epoxy compound.

TABLE 1

| Example no. | Type of binding phase raw material | Amount of binding phase raw material [% by weight] | Boron nitride primary particles (starting powder) *) [% by weight] | Nitriding temperature [° C.] |
|---|---|---|---|---|
| Example 1 | Al grit | 1 | 99 | 2050 |
| Example 2 | Al grit | 5 | 95 | 1600 |
| Example 3 | Al grit | 5 | 95 | 1950 |
| Example 4 | Al grit | 5 | 95 | 2050 |
| Example 5 | Al grit | 10 | 90 | 1600 |
| Example 6 | Al grit | 10 | 90 | 1950 |
| Example 7 | Al grit | 10 | 90 | 2050 |
| Example 8 | Al grit | 30 | 70 | 1600 |
| Example 9 | Al grit | 30 | 70 | 1950 |
| Example 10 | Al grit | 30 | 70 | 2050 |
| Example 11 | Al Pyro | 5 | 95 | 1600 |
| Example 12 | Al Pyro | 10 | 90 | 1600 |
| Example 13 | Al Pyro | 10 | 90 | 1950 |
| Example 14 | Al Pyro | 10 | 90 | 2050 |
| Example 15 | Al Pyro | 30 | 70 | 1600 |
| Example 16 | Al Pyro | 30 | 70 | 1950 |
| Example 17 | Al Pyro | 30 | 70 | 2050 |
| Example 18 | Alupor SK | 5 | 95 | 1950 |
| Example 19 | Alupor SK | 10 | 90 | 1600 |
| Example 20 | Alupor SK | 10 | 90 | 1950 |
| Example 21 | Alupor SK | 10 | 90 | 2050 |
| Example 22 | Alupor SK | 30 | 70 | 1600 |
| Example 23 | Alupor SK | 30 | 70 | 1950 |
| Example 24 | Alupor SK | 30 | 70 | 2050 |
| Example 25 | TiO₂ powder | 10 | 90 | 1950 |
| Example 26 | TiB₂ powder | 10 | 90 | 1950 |
| Example 27 | Ti powder | 10 | 90 | 1950 |
| Example 28 | TiO₂ powder | 10 | 90 (BN amorphous) | 1950 |
| Example 29 | TiB₂ powder | 10 | 90 (BN amorphous) | 1950 |
| Example 30 | Ti powder | 10 | 90 (BN amorphous) | 1950 |
| Example 31 | AlN powder | 14 | 86 | 1950 |
| Example 32 | Alupor SK | 45 | 55 | 1950 |
| Example 33 | Alupor SK | 60 | 40 | 1950 |
| Example 34 | Alupor SK | 75 | 25 | 1950 |
| Example 35 | Alupor SK | 30 | 70 (BN with $d_{50}$ = 12 μm) | 1950 |
| Comparative example 1 | — | 0 | 100 | 1600 |
| Comparative example 2 | — | 0 | 100 | 1950 |
| Comparative example 3 | — | 0 | 100 | 2050 |

*) BORONID ®-S1, unless otherwise indicated
(see description of the examples)

TABLE 2

| Example no. | Agglomerates Binding phase Phases (with X-ray radiography) | Agglomerates Binding phase Amount [% by weight, calculated] | Agglomerate size $d_{50}$ [μm] | Agglomerate size $d_{90}$ [μm] | Agglomerate stability [%] | BN epoxide compound TC [W/m * K] |
|---|---|---|---|---|---|---|
| Example 1 | AlN | 1.5 | 136 | 223 | 35 | 2.71 |
| Example 2 | AlN | 7.4 | 150 | 227 | 70 | 2.58 |
| Example 3 | AlN | 7.4 | 142 | 226 | 50 | 2.53 |
| Example 4 | AlN | 7.4 | 147 | 240 | 60 | 2.61 |
| Example 5 | AlN | 14.5 | 155 | 239 | 80 | 2.52 |
| Example 6 | AlN | 14.5 | 141 | 241 | 70 | 2.52 |
| Example 7 | AlN | 14.5 | 142 | 224 | 80 | 2.46 |
| Example 8 | AlN | 39.5 | 167 | 259 | 100 | 2.04 |
| Example 9 | AlN | 39.5 | 163 | 261 | 90 | 2.32 |
| Example 10 | AlN | 39.5 | 148 | 238 | 95 | 2.65 |
| Example 11 | AlN/Al$_8$O$_3$N$_6$ | 7.4 | 135 | 214 | 35 | 2.33 |
| Example 12 | AlN/Al$_8$O$_3$N$_6$ | 14.5 | 141 | 226 | 70 | 2.46 |
| Example 13 | AlN/Al$_8$O$_3$N$_6$ | 14.5 | 128 | 225 | 45 | 2.28 |
| Example 14 | AlN/Al$_8$O$_3$N$_6$ | 14.5 | 135 | 236 | 50 | 2.63 |
| Example 15 | AlN/Al$_8$O$_3$N$_6$ | 39.5 | 163 | 256 | 80 | 2.09 |
| Example 16 | AlN/Al$_8$O$_3$N$_6$ | 39.5 | 134 | 267 | 90 | 2.26 |
| Example 17 | AlN/Al$_8$O$_3$N$_6$ | 39.5 | 145 | 237 | 90 | 2.43 |
| Example 18 | AlN | 7.4 | 121 | 211 | 40 | 2.72 |
| Example 19 | AlN | 14.5 | 137 | 217 | 45 | 2.49 |
| Example 20 | AlN | 14.5 | 134 | 229 | 45 | 2.65 |
| Example 21 | AlN | 14.5 | 131 | 209 | 50 | 3.02 |
| Example 22 | AlN | 39.5 | 150 | 254 | 80 | 2.50 |
| Example 23 | AlN | 39.5 | 158 | 259 | 90 | 2.8 |
| Example 24 | AlN | 39.5 | 147 | 245 | 80 | 3.20 |
| Example 25 | TiN/TiB$_2$ | 8 | 183 | 293 | 80 | 3.74 |
| Example 26 | TiN/TiB$_2$ | 9 | 175 | 280 | 95 | 2.97 |
| Example 27 | TiN/TiB$_2$ | 13 | 174 | 279 | 75 | 3.56 |
| Example 28 | TiN/TiB$_2$ | 8 | 166 | 260 | 65 | 2.25 |
| Example 29 | TiN/TiB$_2$ | 9 | 170 | 268 | 70 | 2.78 |
| Example 30 | TiN/TiB$_2$ | 13 | 170 | 269 | 70 | 2.7 |
| Example 31 | AlN | 14 | 136 | 215 | 35 | 2.29 |
| Example 32 | AlN | 55.4 | 180 | 292 | 95 | 1.90 |
| Example 33 | AlN | 69.5 | 181 | 298 | 95 | 1.98 |
| Example 34 | AlN | 82.0 | 171 | 271 | 100 | 1.72 |
| Example 35 | AlN | 39.5 | 172 | 285 | 80 | 1.99 |
| Comparative example 1 | — | 0 | 141 | 223 | 20 | 2.02 |
| Comparative example 2 | — | 0 | 139 | 226 | 30 | 2.42 |
| Comparative example 3 | — | 0 | 144 | 233 | 25 | 2.58 |

The invention claimed is:

1. Boron nitride agglomerates comprising hexagonal boron nitride primary particles, wherein the hexagonal boron nitride primary particles are connected to one another by means of an inorganic binding phase which comprises at least one nitride and/or oxynitride, wherein the binding phase comprises at least one nitride and/or oxynitride of the elements aluminum, silicon, or titanium.

2. Boron nitride agglomerates according to claim 1, wherein the binding phase comprises one or more compounds selected from the group consisting of aluminum nitride, aluminum oxynitride, silicon nitride, silicon oxynitride, titanium nitride, sialon and boron nitride.

3. Boron nitride agglomerates according to claim 1, wherein the binding phase comprises aluminum nitride and/or aluminum oxynitride and/or boron nitride.

4. Boron nitride agglomerates according to claim 1, wherein the binding phase furthermore comprises at least one oxide selected from the group consisting of boron oxide, aluminum oxide, silicon dioxide, titanium dioxide, yttrium oxide, magnesium oxide, calcium oxide and rare earth metal oxides.

5. Boron nitride agglomerates according to claim 1, wherein the proportion of nitrides and oxynitrides in the binding phase is at least 50% by weight, based on the total weight of the binding phase.

6. Boron nitride agglomerates according to claim 1, wherein the average agglomerate size ($d_{50}$) of the boron nitride agglomerates is 1 mm or less.

7. Boron nitride agglomerates according to claim 1, wherein the proportion of the binding phase is at least 0.5% by weight, based on the total weight of the boron nitride agglomerates.

8. Boron nitride agglomerates according to claim 1, wherein the proportion of the binding phase is no more than 60% by weight, based on the total weight of the boron nitride agglomerates.

9. Method for producing boron nitride agglomerates according to claim 1, wherein boron nitride starting powders in the form of boron nitride primary particles are mixed with binding phase raw materials, are processed into granules or shaped articles, and these granules or shaped articles are subsequently subjected to a temperature treatment at a temperature of at least 1000° C. in a nitriding atmosphere, and wherein the obtained granules or shaped articles are comminuted and/or fractionated, if necessary.

10. Method for producing boron nitride agglomerates according to claim 9, wherein hexagonal boron nitride, amorphous boron nitride, partially crystalline boron nitride or mixtures thereof may be used as the boron nitride starting powder.

11. Method for producing boron nitride agglomerates according to claim 9, wherein the average particle size $d_{50}$ of the boron nitride starting powder is 0.5-50 µm.

12. Method for producing boron nitride agglomerates according to claim 9, wherein the nitriding atmosphere comprises nitrogen and/or ammonia.

13. Method for producing boron nitride agglomerates according to claim 9, wherein the temperature treatment in the nitriding atmosphere is carried out at temperatures of at least 1400° C.

14. Method for producing boron nitride agglomerates according to claim 9, wherein the boron nitride agglomerates are subjected to a surface modification in a further treatment step.

15. Method for producing boron nitride agglomerates according to claim 9, wherein metal powders are used as the binding phase raw materials for producing the binding phase.

16. Method for producing boron nitride agglomerates according to claim 9, wherein metal compounds are used in combination with reducing agents as the binding phase raw materials for producing the binding phase.

17. Method for producing boron nitride agglomerates according to claim 9, wherein reactants for the production of boron nitride are used as the binding phase raw materials for producing the binding phase.

18. Method for producing boron nitride agglomerates according to claim 9, wherein nitride and/or oxynitride compounds which solidify during the temperature treatment in the nitriding atmosphere are used as the binding phase raw materials for producing the binding phase.

19. Polymer-boron nitride composite material comprising boron nitride agglomerates according claim 1.

* * * * *